US008863267B2

(12) United States Patent
Selitser et al.

(10) Patent No.: US 8,863,267 B2
(45) Date of Patent: *Oct. 14, 2014

(54) SUBSCRIBER BASED POLICY FOR SERVICE NETWORK GATEWAYS

(75) Inventors: Boris Selitser, Castro Valley, CA (US); Daniel Jansson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 613 days.

This patent is subject to a terminal disclaimer.

(21) Appl. No.: 12/492,522

(22) Filed: Jun. 26, 2009

(65) Prior Publication Data

US 2010/0333187 A1 Dec. 30, 2010

(51) Int. Cl.
| | |
|---|---|
| *G06F 9/00* | (2006.01) |
| *H04L 29/06* | (2006.01) |
| *G06F 21/62* | (2013.01) |
| *H04L 29/08* | (2006.01) |

(52) U.S. Cl.
CPC .......... *H04L 63/102* (2013.01); *G06F 21/6218* (2013.01); *H04L 67/306* (2013.01)
USPC ...... 726/12; 726/1; 726/4; 709/223; 709/227; 709/229; 455/410; 455/430; 455/417; 370/401; 705/52

(58) Field of Classification Search
USPC ........ 709/225; 455/453, 411; 705/34; 726/12
See application file for complete search history.

(56) References Cited

U.S. PATENT DOCUMENTS

| | | | |
|---|---|---|---|
| 6,151,497 A * | 11/2000 | Yee et al. .................... 455/430 |
| 6,603,969 B1 | 8/2003 | Vuoristo et al. | |
| 6,725,036 B1 | 4/2004 | Faccin et al. | |
| 6,931,011 B2 | 8/2005 | Giacopelli et al. | |
| 7,180,860 B2 | 2/2007 | Fonden et al. | |
| 7,289,788 B2 * | 10/2007 | Shan ............................ 455/410 |
| 7,444,306 B2 * | 10/2008 | Varble ........................... 705/52 |
| 7,957,403 B2 * | 6/2011 | Jansson ......................... 370/401 |
| 2002/0156741 A1 * | 10/2002 | Furukawa ....................... 705/52 |
| 2002/0162008 A1 | 10/2002 | Hill | |
| 2005/0266836 A1 * | 12/2005 | Shan ............................ 455/417 |
| 2006/0195546 A1 | 8/2006 | Hulse et al. | |
| 2007/0038762 A1 * | 2/2007 | Moerdijk ...................... 709/229 |
| 2007/0078988 A1 * | 4/2007 | Miloushev et al. ........... 709/227 |
| 2008/0165789 A1 * | 7/2008 | Ansari et al. .................. 370/401 |
| 2009/0288136 A1 * | 11/2009 | Chang et al. ..................... 726/1 |
| 2010/0107220 A1 * | 4/2010 | Nguyen ............................. 726/3 |
| 2010/0107225 A1 * | 4/2010 | Spencer et al. .................... 726/4 |
| 2010/0226286 A1 * | 9/2010 | Rossotto et al. .............. 370/259 |
| 2010/0303087 A1 * | 12/2010 | Miao et al. .................... 370/401 |

FOREIGN PATENT DOCUMENTS

EP     1324623 B1    10/2006

OTHER PUBLICATIONS

IBM, "WebShere Telecom Web Services Server", 3 pages. http://www-142.ibm.com/software/dre/ecatalog/detail.wss?locale=en_US&synkey=P512911S21012X96.

Clemm, "Profile-Based Subscriber Server Provisioning", 2002, 1 page. http://ieeexplore.ieee.org/stamp/stamp.jsp?arnumber=01015608.

* cited by examiner

*Primary Examiner* — Kambiz Zand
*Assistant Examiner* — Sayed Beheshti Shirazi
(74) *Attorney, Agent, or Firm* — Meyer IP Law Group

(57) ABSTRACT

A subscriber network can provide services. External applications can use the services on the subscriber network. A service access gateway can control application access to services of the subscriber network. The service access gateway can filter requests from an external application to access services on the subscriber network based on the customer for which the external application is accessing the service.

18 Claims, 4 Drawing Sheets

SUBSCRIBER BASED POLICY FOR SERVICE NETWORK GATEWAYS

BACKGROUND

With the ever-increasing popularity of the World Wide Web, more and more previously unrelated technologies are becoming integrated with the enormous network of information and functionality that the internet provides. Everything from television and radio to books and encyclopedias are becoming available online, amongst a wide variety of other technologies. One such area of technology is telephony and the related telecommunications services.

DETAILED DESCRIPTION

Figure 1:
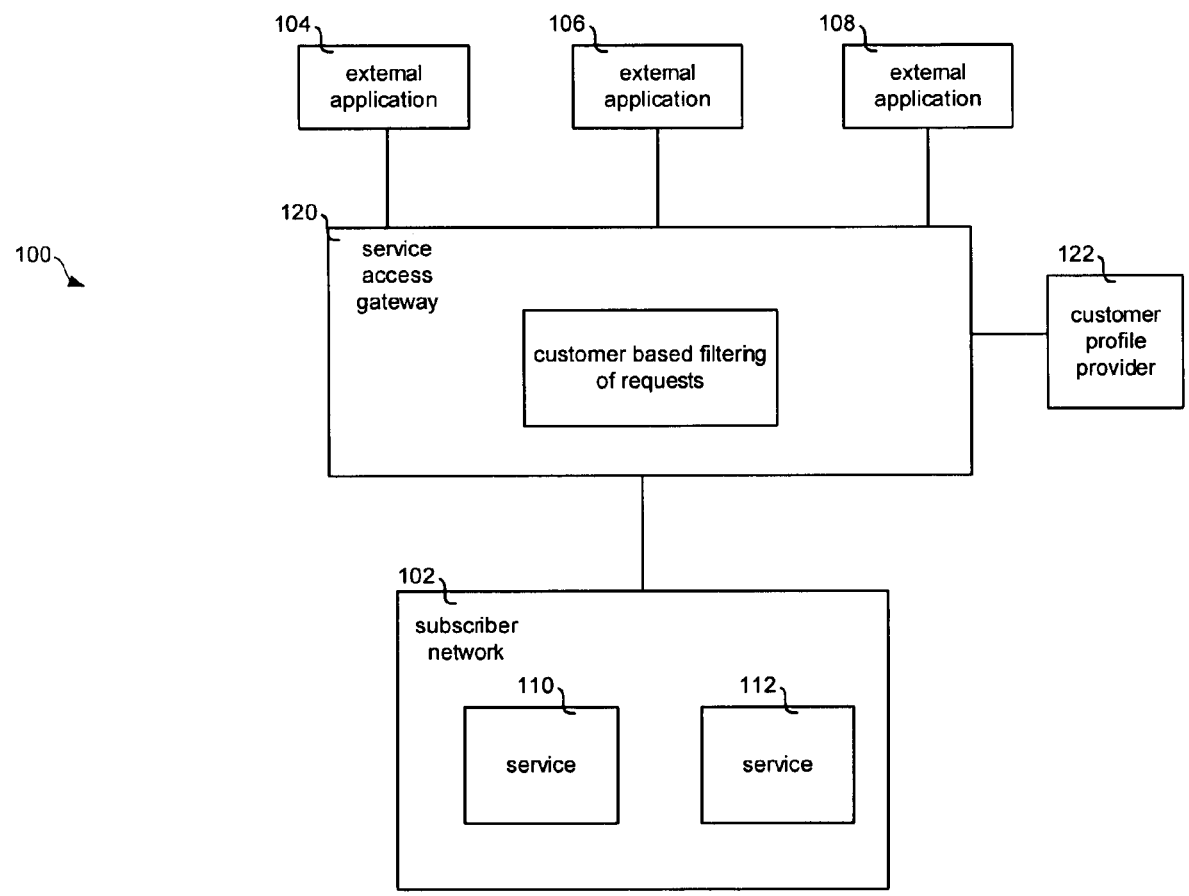
FIG. 1 shows an exemplary system of one embodiment of the present invention.

As shown in FIG. 1, one embodiment of the present invention includes a subscriber network 102 providing services 110 and 112. Subscriber network services can include delivery of short messages to the subscriber's mobile device, obtaining the geographic location of the subscriber's mobile device, etc. External applications 104, 106 and 108 use the services on the subscriber network 102. Service providers can provide these external applications 104, 106 and 108.

A service access gateway 120 can control application access to services 110 and 112 of the subscriber network 102. The service access gateway 120 can filter requests from an external application 104 to access a service 110 on the subscriber network based on the customer (subscriber) for which the external application is accessing the service.

Figure 2:
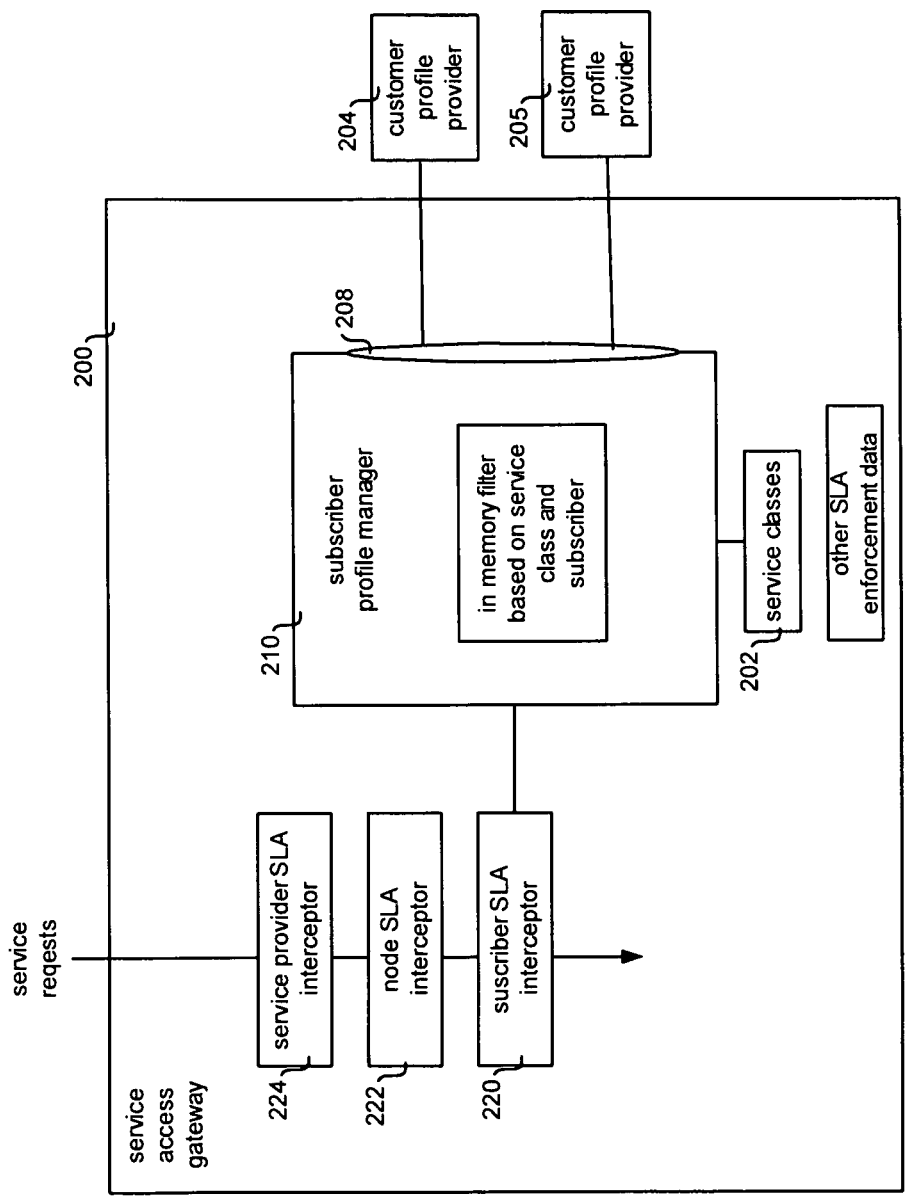
FIG. 2 shows an exemplary gateway of one embodiment of the present invention.

FIG. 2 shows an exemplary gateway 200. The service access gateway can maintain service classes 202 that indicate an external application and service.

The service classes 202 can further include restriction information.

The service access gateway 200 can store indications of which customer opts in or opts out of which service classes. This can be done using an in-memory filter based on service class and customer. The customer can be identified by information, such as an URI or a customer ID.

A profile provider 204 can register a customer profile with the service access gateway 200 so that the service access gateway 200 can determine how to filter external application requests for the customer. An API 208 can allow multiple profile providers 204 and 205 to register with a subscriber profile manager 210.

An interceptor 220 at the service access gateway can be used to intercept requests to check whether the external application can access a service for a customer. In one embodiment, the interceptors can be chained components that process requests in order. In one embodiment, the interceptor can pass, block or allow a request. Other interceptors can include a service provider SLA interceptor 222 and a subscriber network node level SLA interceptor 224.

A subscriber profile manager 210 can maintain in memory filters for service classes for a customer.

Figure 3:
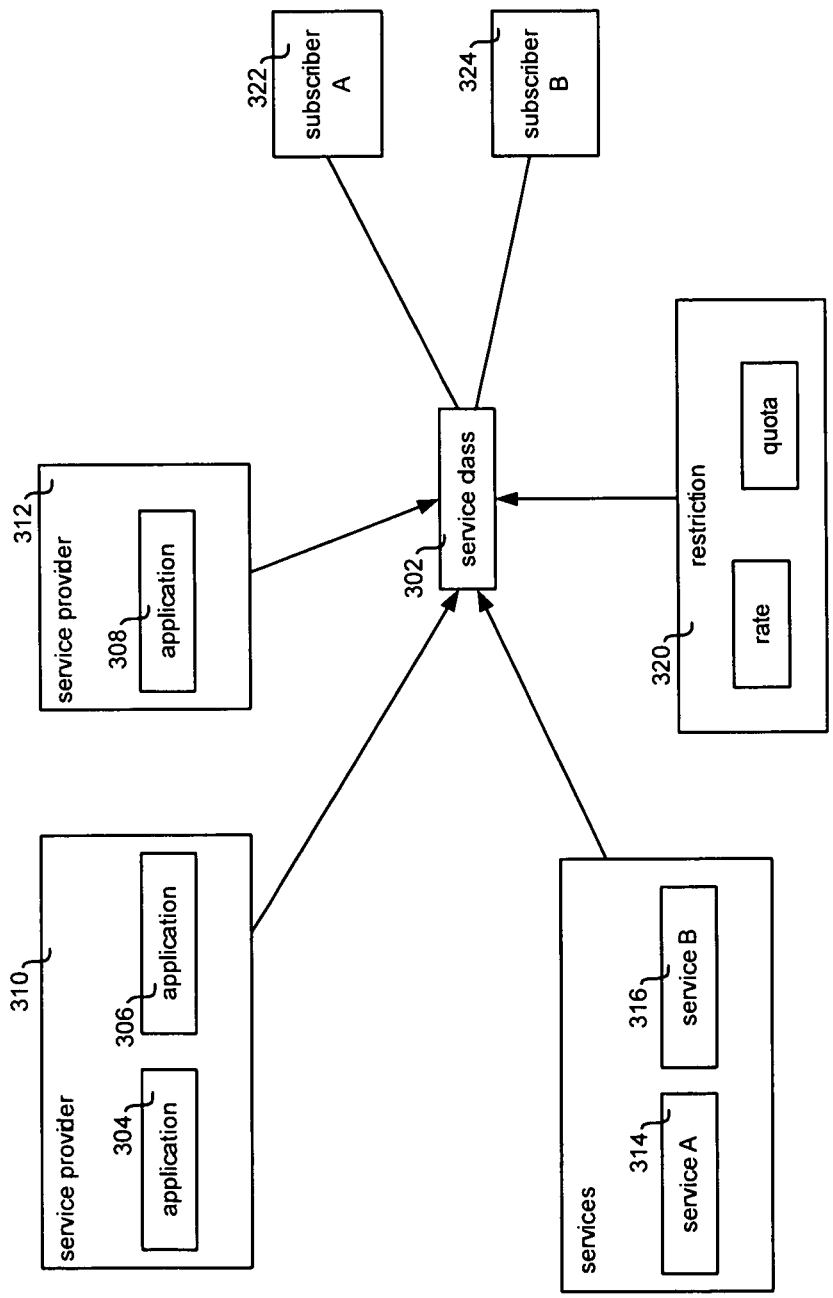
FIG. 3 shows an exemplary service class of one embodiment of the present invention.

FIG. 3 shows an example of service class 302. The service class 302 is associated with applications 304, 306 and 308 from service providers 310 and 312 and services 314 and 316 from the subscriber network. Service class 302 also has associated restriction information 320. In this example, service class 302 is associated with subscribers 322 and 324.

In the example of FIG. 3, if application 304 makes a request on service 314 for a customer, the gateway checks whether any service classes are associated with this request.

In this example, service class 302 is associated with the request. The gateway also knows what subscribers are associated with the service class 302. In this example, if the request is done for subscriber 322, the request can be allowed subject to the restrictions 320 of the service class 302 and any restrictions associated with the subscriber profile.

An exemplary service class definition is shown below:

```
<ServiceClass name="news_subscription">
    <references>
        References include service provider groups, application groups,
        and service interfaces.
    <references>
    <restriction>
        Rate or quota throttling restriction on service usage.
    </restriction>
</ServiceClass>
```

A Service Class can be a Quality of Service (QoS) grouping for some set of subscribers. The service class can define an intersection of services being requested with applications requesting that service.

A Subscriber Address can be used which is a URI in the request that uniquely identifies a subscriber. The subscriber address can be a destination address for a particular service.

The Subscriber Address can be extracted across all network traffic through service gateway for routing and other decisions. The Subscriber Address can be masked or mapped through an external lookup.

Subscriber Contract can be a rate and/or quota restriction per Subscribers Address within a specific Service Class. Rate and quota can be defined in terms of some timeframe. Rate and quota restrictions can restrict the use by a customer per unit time. Rate relates to a short timeframe such as a use per second and thus rate count information need not be persisted. Quota relates to a longer timeframe, such as use per month. Quota count information can be persisted to deal with server crashes and the like.

A request that matches a particular Service Class can be restricted in rate and/or quota amounts maintained for a given Subscriber Address. Subscriber Service Level Agreements (SLAs) can be instances of Service Class definitions that are mapped to particular subscribers. A service class can be a restriction expressed in rate or quota request rate applied to some combination of applications, service providers, and services.

Figure 4:
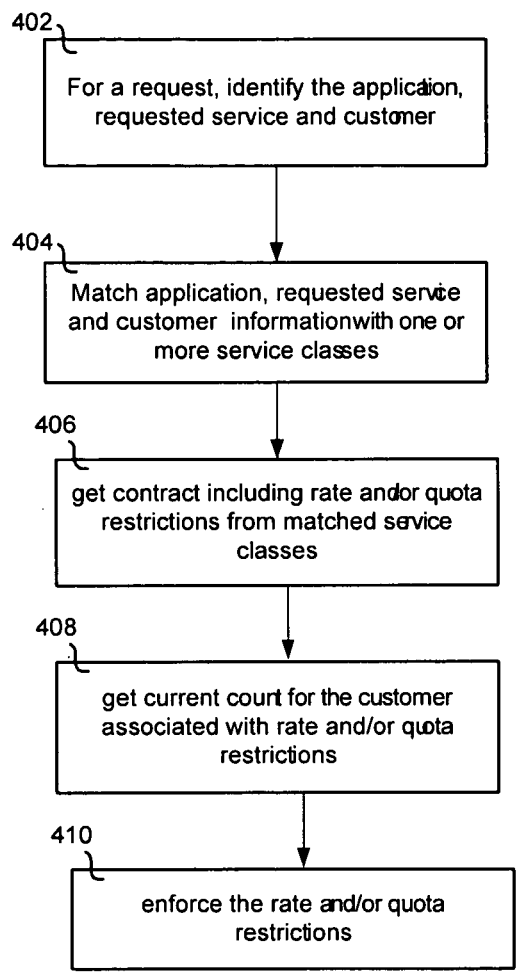
FIG. 4 shows a flowchart illustrating a method of the present invention.

FIG. 4 shows an example of a method of the present invention. In step 402, for a request, the application, the requested service and customer are identified. In step 404, the application, requested server and customer information is matched with any matching service classes. In step 406, contract information, including rate and quota restrictions from the matched service classes is obtained. In step 408, the current usage count(s) for the customer relevant to the rate and/or quota restriction is obtained from memory. In step 410, the rate and/or quota restrictions are enforced. For example, if the rate and/or quota restrictions are exceeded, the request can be denied or some other action taken.

A Profile Provider can be an extension that maps profile data onto Service Class for some range of subscribers.

Subscriber SLA contracts can be used. Throttling restrictions, such as the rate/quota restrictions, can be defined in the subscriber SLA or can come from the user profile. In one embodiment, the 'Null restriction' does not allow any traffic for a Service Class for a subscriber.

In various embodiments, the network gatekeeper application can be built on top of a JAVA 2 Enterprise Edition (J2EE) compliant application server. The gatekeeper can provide a policy driven telecommunications web services gateway that allows granular control over access to network resources from un-trusted domains. In one embodiment, the gatekeeper is a service access gateway deployed by a telecom provider in order to manage access to its network by the third party services that are offered to the various subscribers of the telecom provider.

As previously mentioned, the various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A system for filtering requests to a service access gateway comprising:
a service access gateway, executing on a computer, including a computer readable medium and processor, providing access to a subscriber network that provides services to subscriber equipment connected to the subscriber network;
one or more external applications provided by one or more service providers, wherein said one or more external applications make requests for said services provided by the subscriber network, for a customer identified by an identifier, wherein the identifier is included in each said request and extracted therefrom through the service access gateway for routing the requested services to the customer, and wherein the identifier is masked and mapped through an external lookup;
wherein the service access gateway is operable to control access to said services of the subscriber network by said external applications by performing steps comprising
maintaining a plurality of service classes, each said service class being an artifact with methods and properties, wherein at least one of the service classes is configured using a configuration file that includes references to the service providers, the external applications, the services on the subscriber network, and rate and quota restrictions on service usage for the customer,
filtering the requests via a plurality of interceptors,
identifying the service class associated with the customer from the plurality of service classes using an in-memory filter that includes indications of associations between customers and service classes,
obtaining the rate and quota restrictions for the customer from the configuration file of the service class, and current usage counts associated with the customer, and
controlling the requests based on the current usage counts and the rate and quota restrictions.

2. The system of claim 1, wherein the rate and quota restrictions restrict use per unit time.

3. The system of claim 1, wherein the in-memory filter that includes indications of associations between customers and service classes is stored in a subscriber profile manager in the service access gateway.

4. The system of claim 1, wherein a profile provider registers a profile with the service access gateway so that the service access gateway determines how to filter the external application requests for the customer.

5. The system of claim 1, wherein the plurality of interceptors at the service access gateway include a service provider service level agreement (SLA) interceptor and a subscriber network node SLA interceptor.

6. A non-transitory computer readable storage medium including instructions stored thereon which, when executed by a processor, cause the processor to perform the steps comprising:
providing a service access gateway, executing on one or more microprocessors, wherein the service access gateway includes a plurality of service classes, wherein each said service class is an artifact with methods and properties, wherein at least one of the service classes is configured using a configuration file that includes references to one or more service providers, one or more external applications, one or more services on a subscriber network, and rate and quota restrictions on service usage for a customer;
receiving, via the service access gateway, a plurality of requests from said external applications for access to said services of the subscriber network provided to subscriber equipment connected to said subscriber network, wherein said external applications are provided by a said service provider, and wherein the requests are made for the customer identified by an identifier, wherein the identifier is included in each said request and extracted therefrom through the service access gateway for routing the requested services to the said customer, and wherein the identifier is masked and mapped through an external lookup;
filtering the requests based on a plurality of inceptors in the service access gateway;
identifying a service class associated with the customer from the plurality of service classes using an in-memory filter that includes indications of associations between customers and service classes;

obtaining the rate and quota restrictions for the customer from the configuration file of the service class, and current usage counts associated with the customer; and controlling the requests based on the current usage counts and the rate and quota restrictions.

7. The non-transitory computer readable storage medium of claim 6, wherein the rate and quota restrictions restrict use per unit time.

8. The non-transitory computer readable storage medium of claim 6, wherein the in-memory filter that includes indications of associations between customers and service classes is stored in a subscriber profile manager in the service access gateway.

9. The non-transitory computer readable storage medium of claim 6, wherein a profile provider registers a profile with the service access gateway so that the service access gateway determines how to filter the external application requests for the customer.

10. The non-transitory computer readable storage medium of claim 6, wherein the plurality of interceptors at the service access gateway include a service provider service level agreement (SLA) interceptor and a subscriber network node SLA interceptor.

11. A method for filtering requests to a service access gateway, comprising:

providing a service access gateway, executing on one or more microprocessors, wherein the service access gateway includes a plurality of service classes, wherein each said service class is an artifact with methods and properties, wherein at least one of the service classes is configured using a configuration file that includes references to one or more service providers, one or more external applications, one or more services on a subscriber network, and rate and quota restrictions on service usage for a customer;

receiving, via the service access gateway, a plurality of requests from said external applications for access to said services of the subscriber network provided to subscriber equipment connected to said subscriber network, wherein said external applications are provided by a said service provider, and wherein the requests are made for the customer identified by an identifier, wherein the identifier is included in each said request and extracted therefrom through the service access gateway for routing the requested services to the said customer, and wherein the identifier is masked and mapped through an external lookup;

filtering the requests based on a plurality of inceptors in the service access gateway;

identifying a service class associated with the customer from the plurality of service classes using an in-memory filter that includes indications of associations between customers and service classes;

obtaining the rate and quota restrictions for the customer from the configuration file of the service class, and current usage counts associated with the customer; and controlling the requests based on the current usage counts and the rate and quota restrictions.

12. The method of claim 11, wherein the rate and quota restrictions restrict use per unit time.

13. The method of claim 11, wherein the in-memory filter that includes indications of associations between customers and service classes is stored in a subscriber profile manager in the service access gateway.

14. The method of claim 11, wherein a profile provider registers a profile with the service access gateway so that the service access gateway determines how to filter the external application requests for the customer.

15. The method of claim 11, wherein the plurality of interceptors at the service access gateway include a service provider service level agreement (SLA) interceptor and a subscriber network node SLA interceptor.

16. The system of claim 1, wherein the identifier is a subscriber address that uniquely identifies the customer.

17. The non-transitory computer readable storage medium of claim 6, wherein the identifier is a subscriber address that uniquely identifies the customer.

18. The method of claim 11, wherein the identifier is a subscriber address that uniquely identifies the customer.

* * * * *

UNITED STATES PATENT AND TRADEMARK OFFICE
CERTIFICATE OF CORRECTION

PATENT NO. : 8,863,267 B2  
APPLICATION NO. : 12/492522  
DATED : October 14, 2014  
INVENTOR(S) : Selitser et al.

It is certified that error appears in the above-identified patent and that said Letters Patent is hereby corrected as shown below:

On the title page item (56), column 1, under Other Publications, line 1, delete "WebShere" and insert -- WebSphere --, therefor.

In the Drawings,

On sheet 2 of 4, in figure 2, line 2, delete "reqests" and insert -- requests --, therefor.

On sheet 2 of 4, in figure 2, under Reference Numeral 220, line 1, delete "suscriber" and insert -- subscriber --, therefor.

On sheet 4 of 4, in figure 4, under Reference Numeral 404, line 2, delete "informationwith" and insert -- information with --, therefor.

Signed and Sealed this  
Eleventh Day of August, 2015

Michelle K. Lee  
*Director of the United States Patent and Trademark Office*